United States Patent
Phillips et al.

(10) Patent No.: US 12,258,041 B2
(45) Date of Patent: Mar. 25, 2025

(54) SYSTEMS AND METHODS FOR CONTROLLING A VEHICLE USING HIGH PRECISION AND HIGH RECALL DETECTION

(71) Applicant: Kodiak Robotics, Inc., Mountain View, CA (US)

(72) Inventors: Derek J. Phillips, Mountain View, CA (US); Collin C. Otis, Driggs, ID (US); Andreas Wendel, Mountain View, CA (US); Jackson P. Rusch, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 197 days.

(21) Appl. No.: 18/065,419

(22) Filed: Dec. 13, 2022

(65) Prior Publication Data

US 2024/0190466 A1    Jun. 13, 2024

(51) Int. Cl.
*B60W 60/00* (2020.01)
*G01S 13/86* (2006.01)

(52) U.S. Cl.
CPC ....... *B60W 60/0011* (2020.02); *G01S 13/862* (2013.01); *G01S 13/865* (2013.01); *B60W 2420/403* (2013.01); *B60W 2420/408* (2024.01); *B60W 2420/54* (2013.01)

(58) Field of Classification Search
CPC ....... B60W 60/0011; B60W 2420/403; B60W 2420/408; B60W 2420/54; G01S 13/862; G01S 13/865; G01S 7/417; G01S 13/726; G01S 15/931; G01S 17/66; G01S 17/87; G01S 17/931; G01S 2013/9318; G01S 2013/93185; G01S 2013/9319; G01S 2013/9323; G01S 2013/9324

See application file for complete search history.

(56) References Cited

U.S. PATENT DOCUMENTS

| | | | |
|---|---|---|---|
| 11,370,424 B1 * | 6/2022 | Cohen | G06V 10/25 |
| 2017/0123428 A1 | 5/2017 | Levinson et al. | |
| 2018/0032078 A1 | 2/2018 | Ferguson et al. | |
| 2018/0173971 A1 * | 6/2018 | Jia | G06N 3/084 |
| 2019/0180467 A1 * | 6/2019 | Li | G01S 17/93 |
| 2019/0347805 A1 | 11/2019 | Potthast | |
| 2020/0191914 A1 * | 6/2020 | Kunz | G01S 7/4802 |
| 2021/0303956 A1 | 9/2021 | Thorsen et al. | |
| 2022/0283587 A1 | 9/2022 | Kabzan et al. | |

* cited by examiner

*Primary Examiner* — Isaac G Smith
*Assistant Examiner* — Nikki M Molina
(74) *Attorney, Agent, or Firm* — Fox Rothschild LLP

(57) ABSTRACT

This disclosure provides systems and methods for controlling a vehicle. The method comprises receiving data from a set of sensors, wherein the data represents objects or obstacles in an environment of the autonomous vehicle; identifying objects or obstacles from the received data; determining multiple sets of attributes of the objects or obstacles, wherein each set of attributes of the objects or obstacles are determined based on data received by an individual sensor; determining a candidate trajectory for the autonomous vehicle based on the multiple sets of attributes of the objects or obstacles; and controlling the autonomous vehicle according to the candidate trajectory.

20 Claims, 7 Drawing Sheets

300

```
Receive data from a set of sensors, wherein the data represents objects or obstacles in
an environment of the autonomous vehicle
301a
```
↓
```
Identify objects or obstacles from the received data
302a
```
↓
```
Determine multiple sets of attributes of the objects or obstacles, wherein each set of
attributes of the objects or obstacles are determined based on data received by an
individual sensor
303a
```
↓
```
Determine a candidate trajectory for the autonomous vehicle based on the multiple
sets of attributes of the objects or obstacles
304a
```
↓
```
Controlling the autonomous vehicle according to the candidate trajectory
305a
```

┌─────────────────────────────────────────────────────────────────┐
│ Receive data from a set of sensors, wherein the data represents objects or obstacles in │
│ an environment of the autonomous vehicle │
│ 301b │
└─────────────────────────────────────────────────────────────────┘
                                    ↓
┌─────────────────────────────────────────────────────────────────┐
│ Determine attributes of each of the objects or obstacles based on the received data │
│ from the set of sensors │
│ 302b │
└─────────────────────────────────────────────────────────────────┘
                                    ↓
┌─────────────────────────────────────────────────────────────────┐
│ Integrate the attributes of each of the objects or obstacles │
│ 303b │
└─────────────────────────────────────────────────────────────────┘
                                    ↓
┌─────────────────────────────────────────────────────────────────┐
│ Identify objects or obstacles based on the integrated attributes │
│ 304b │
└─────────────────────────────────────────────────────────────────┘
                                    ↓
┌─────────────────────────────────────────────────────────────────┐
│ Determine a candidate trajectory for the autonomous vehicle to avoid the │
│ objects or obstacles │
│ 305b │
└─────────────────────────────────────────────────────────────────┘
                                    ↓
┌─────────────────────────────────────────────────────────────────┐
│ Control the autonomous vehicle according to the candidate trajectory │
│ 306b │
└─────────────────────────────────────────────────────────────────┘

| Receive data from a set of sensors, wherein the data represents objects or obstacles in an environment of the autonomous vehicle |
| --- |
| 311 |

↓

| Generate high precision detection data based on the received data |
| --- |
| 312 |

↓

| Identify from the high precision detection data a first set of objects or obstacles that are classifiable by at least one known classifier |
| --- |
| 313 |

↓

| Track movement of one or more objects in the first set of objects or obstacles over time and maintain identity of the tracked objects in the first set of objects or obstacles |
| --- |
| 314 |

↓

| Generate high recall detection data based on the received data |
| --- |
| 315 |

↓

| Identify from the high recall detection data a second set of objects or obstacles without using any classifier |
| --- |
| 316 |

↓

| Filter out objects, from the second set of objects or obstacles, that correspond to the tracked objects in the first set of objects or obstacles, to obtain a filtered set of objects or obstacles |
| --- |
| 317 |

↓

| Determine a candidate trajectory for the autonomous vehicle to avoid at least the tracked objects in the first set of objects or obstacles and the filtered set of objects or obstacles |
| --- |
| 318 |

↓

| Control the autonomous vehicle according to the candidate trajectory |
| --- |
| 319 |

FIG. 3c

SYSTEMS AND METHODS FOR CONTROLLING A VEHICLE USING HIGH PRECISION AND HIGH RECALL DETECTION

FIELD

This disclosure relates generally to systems and methods for controlling a vehicle using a combination of high precision detection and high recall detection.

BACKGROUND

Autonomous vehicles refer to vehicles that replace human drivers with sensors, computer-implemented intelligence, and other automation technology. Autonomous vehicles can be used to aid in the transport of passengers or items from one location to another. Such vehicles may operate in a fully autonomous mode where passengers may provide some initial input, such as a pickup or destination location, and the vehicle maneuvers itself to that location. While doing so, the safety of the passengers and the vehicle is an important consideration. Thus, there should be a high degree of confidence that autonomous vehicles will not collide with rare things or things the perception system has never seen before, while performing well in nominal cases with common and known object types.

Therefore, there is a need for efficient vehicle motion planning systems and methods.

SUMMARY

This disclosure addresses the above need in a number of aspects. In one aspect, this disclosure provides a method for controlling a vehicle.

In some embodiments, the method comprises receiving data from a set of sensors, wherein the data represents objects or obstacles in an environment of the autonomous vehicle; and using a processor: identifying objects or obstacles from the received data; determining multiple sets of attributes of the objects or obstacles, wherein each set of attributes of the objects or obstacles are determined based on data received by an individual sensor; determining a candidate trajectory for the autonomous vehicle based on the multiple sets of attributes of the objects or obstacles; and controlling the autonomous vehicle according to the candidate trajectory.

In some embodiments, the method comprises receiving data from a set of sensors, wherein the data represents objects or obstacles in an environment of the autonomous vehicle; and using a processor: determining attributes of each of the objects or obstacles based on the received data from the set of sensors; integrating the attributes of the each of the objects or obstacles; identifying objects or obstacles based on the integrated attributes; determining a candidate trajectory for the autonomous vehicle to avoid the objects or obstacles; and controlling the autonomous vehicle according to the candidate trajectory.

In some embodiments, the multiple sets of attributes comprise kinematic information, geometric information, or object classification information.

In some embodiments, the method comprises: receiving data from a set of sensors, wherein the data represents objects or obstacles in an environment of the autonomous vehicle; and using a processor: (a) generating high precision detection data based on the received data; (b) identifying from the high precision detection data a first set of objects or obstacles that are classifiable by at least one known classifier; (c) tracking movement of one or more objects in the first set of objects or obstacles over time and maintaining identity of the tracked one or more objects in the first set of objects or obstacles; (d) generating high recall detection data based on the received data; (e) identifying from the high recall detection data a second set of objects or obstacles without using any classifier; (f) filtering out objects, from the second set of objects or obstacles, that correspond to the tracked one or more objects in the first set of objects or obstacles, to obtain a filtered set of objects or obstacles; (g) determining a candidate trajectory for the autonomous vehicle to avoid at least the tracked one or more objects in the first set of objects or obstacles and the filtered set of objects or obstacles; and (h) controlling the autonomous vehicle according to the candidate trajectory.

In some embodiments, the method comprises performing sensor fusion for the received data from the set of sensors. In some embodiments, the method comprises performing sensor fusion for the received data from a set of object detectors.

In some embodiments, the method comprises generating the high precision detection data and the high recall detection data based on different subsets of data received from different sets of sensors.

In some embodiments, the step of filtering comprises filtering out a set of points corresponding to the tracked one or more objects in the first set of objects or obstacles from at least one point cloud of the second set of objects or obstacles.

In some embodiments, the method comprises generating the high precision detection data from the data received from image and point cloud detectors.

In some embodiments, the method comprises generating the high recall detection data from point cloud clustering by LIDAR, stereo depth vision by RADAR, and/or monocular depth vision using learned low-level features by RADAR. In some embodiments, the learned low-level features comprise distance.

In some embodiments, the step of tracking comprises tracking movement of the one or more objects in the first set of objects or obstacles over a period of time when the one or more objects are detectable by the set of sensors. In some embodiments, the period is from about 100 ms to about 500 ms. In some embodiments, the period is about 300 ms.

In some embodiments, the set of sensors comprise a two-dimensional object detector, a three-dimensional object detector, and/or an obstacle detector. In some embodiments, the set of sensors comprise RADAR, LIDAR, camera, sonar, laser, or ultrasound.

In another aspect, this disclosure provides a system for controlling an autonomous vehicle. In some embodiments, the system comprises: a set of sensors, configured to receive data that represents objects or obstacles in an environment of the autonomous vehicle; and a processor, configured to: identify objects or obstacles from the received data; determine multiple sets of attributes of the objects or obstacles, wherein each set of attributes of the objects or obstacles are determined based on data received by an individual sensor; determine a candidate trajectory for the autonomous vehicle based on the multiple sets of attributes of the objects or obstacles; and control the autonomous vehicle according to the candidate trajectory.

In some embodiments, the system comprises: a set of sensors, configured to receive data that represents objects or obstacles in an environment of the autonomous vehicle; and a processor, configured to: determine attributes of each of the objects or obstacles based on the received data from the set of sensors; integrate the attributes of the each of the objects or obstacles; identify objects or obstacles based on the integrated attributes; determine a candidate trajectory for the autonomous vehicle to avoid the objects or obstacles; and control the autonomous vehicle according to the candidate trajectory.

In some embodiments, the system comprises: a set of sensors, configured to receive data that represents objects or obstacles in an environment of the autonomous vehicle; and a processor, configured to: (a) generate high precision detection data based on the received data; (b) identify from the high precision detection data a first set of objects or obstacles that are classifiable by at least one known classifier; (c) track movement of one or more objects in the first set of objects or obstacles over time and maintain identity of the tracked one or more objects in the first set of objects or obstacles; (d) generate high recall detection data based on the received data; (e) identify from the high recall detection data a second set of objects or obstacles without using any classifier; (f) filtering out objects, from the second set of objects or obstacles, that correspond to the tracked one or more objects in the first set of objects or obstacles, to obtain a filtered set of objects or obstacles; (g) determine a candidate trajectory for the autonomous vehicle to avoid at least the tracked one or more objects in the first set of objects or obstacles and the filtered set of objects or obstacles; and (h) control the autonomous vehicle according to the candidate trajectory.

In some embodiments, the processor is further configured to perform sensor fusion for the received data from the set of sensors. In some embodiments, the processor is further configured to perform sensor fusion for the received data from a set of object detectors.

In some embodiments, the processor is configured to generate the high precision detection data and the high recall detection data based on different subsets of data received from different sets of sensors.

In some embodiments, the processor is configured to filter out a set of points corresponding to the tracked one or more objects in the first set of objects or obstacles from at least one point cloud of the second set of objects or obstacles.

In some embodiments, the processor is configured to generate the high precision detection data from the data received from image and point cloud detectors.

In some embodiments, the processor is configured to generate the high recall detection data from point cloud clustering by LIDAR, stereo depth vision by RADAR, and/or monocular depth vision using learned low-level features by RADAR. In some embodiments, the learned low-level features comprise distance.

In some embodiments, the processor is configured to track movement of the one or more objects in the first set of objects or obstacles over a period of time when the one or more objects are detectable by the set of sensors.

In some embodiments, the step of tracking comprises tracking movement of the one or more objects in the first set of objects or obstacles over a period of time when the one or more objects are detectable by the set of sensors. In some embodiments, the period is from about 100 ms to about 500 ms. In some embodiments, the period is about 300 ms.

In some embodiments, the set of sensors comprise a two-dimensional object detector, a three-dimensional object detector, and/or an obstacle detector. In some embodiments, the set of sensors comprise RADAR, LIDAR, camera, sonar, laser, or ultrasound.

BRIEF DESCRIPTION OF THE DRAWINGS

FIG. 3a is a flowchart of an example method for controlling a vehicle based on attributes determined by data received from an individual sensor, according to various embodiments of the present disclosure.

FIG. 3b is a flowchart of an example method for controlling a vehicle based on fusion of sensor data received from a set of sensors, according to various embodiments of the present disclosure.

FIG. 3c is a flowchart of an example method for controlling a vehicle based on a combination of high precision detection and high recall detection, according to various embodiments of the present disclosure.

DETAILED DESCRIPTION

Figure 1:
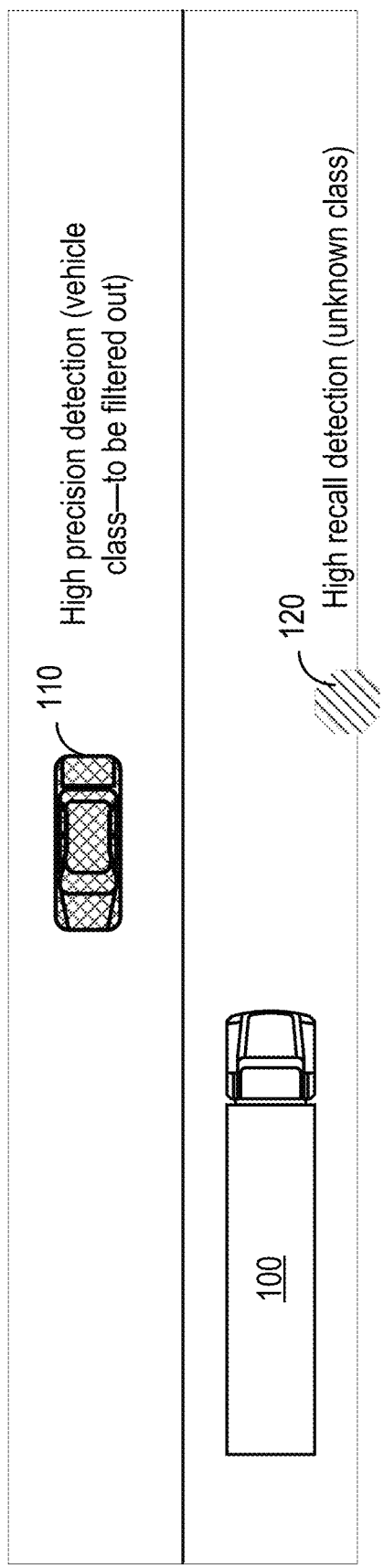
FIG. 1 is a diagram showing high precision detection and high recall detection for detecting objects of known classes and unknown objects by an autonomous vehicle, according to various embodiments of the present disclosure.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility," and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle. Autonomous vehicles may be any type of vehicle including, but not limited to, cars, trucks, motorcycles, busses, recreational vehicles, agricultural vehicles, construction vehicles etc. According to various embodiments, autonomous vehicles may include a throttle control system and a braking system. Autonomous vehicles may include one or more engines and/or one or more computing devices. The one or more computing devices may be separate from the automated speed control system or the braking system. Additionally, the computing device may include a processor and/or a memory. The memory may be configured to store programming instructions that, when executed by the processor, are configured to cause the processor to perform one or more tasks. In certain embodiments, autonomous vehicles may include a receiver configured process the communication between autonomous vehicles and a teleoperation system.

The term "trajectory" or "map" is used broadly to include, for example, a motion plan or any path or route from one place to another; for instance, a path from a pickup location to a drop off location.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion such as by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for controlling a vehicle, according to embodiments of the present disclosure, will be described with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

With reference to FIG. 1, autonomous vehicles, e.g., an autonomous vehicle 100, are required to bring goods or passengers to desired locations safely. There must be a high degree of confidence that autonomous vehicles will not collide with rare things or things a perception system has never seen before, while performing well in nominal cases with common and known object types. However, analyzing the same objects or obstacles observed in both high precision detection and high recall detection can be time-consuming and require a significant amount of processing power. Thus, it is important for the autonomous vehicle 100 to efficiently generate trajectories by reducing duplicate detection or duplicate calculation of objects or obstacles of common and known object types 110 and objects or obstacles without class identification 120 (e.g., rare or unknown objects). To this end, the autonomous vehicle 100 may employ separate detectors for high precision detection and high recall detection, remove duplicate detections, and combine results in a motion planning component.

Figure 2:
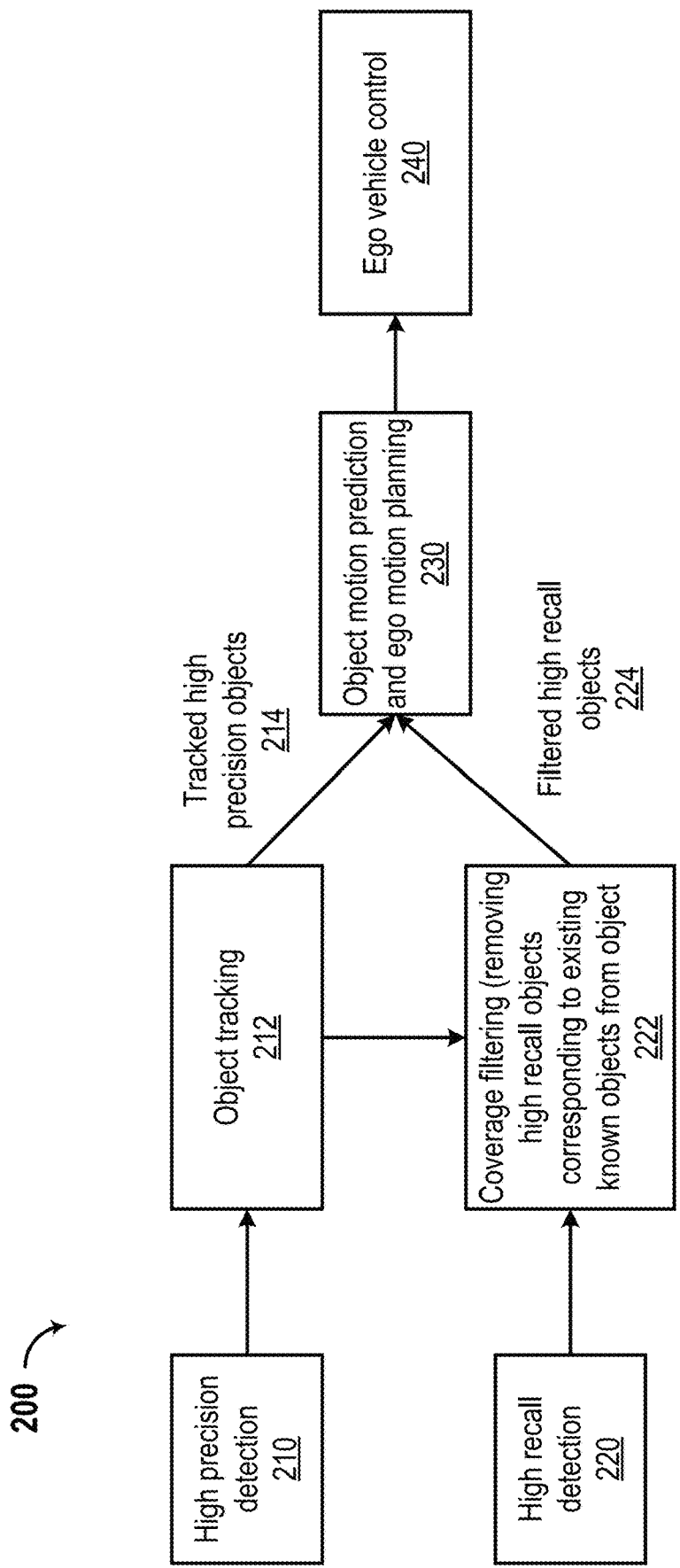
FIG. 2 illustrates an example system for controlling a vehicle based on a combination of high precision detection and high recall detection, according to various embodiments of the present disclosure.

Referring now to FIG. 2, a system 200 may be implemented to control the autonomous vehicle 100 based on high precision detection and high recall detection of objects and obstacles in the environment of the autonomous vehicle 100. The autonomous vehicle 100 may be any type of vehicle including, but not limited to, cars, trucks, motorcycles, buses, recreational vehicles, etc. The system can detect objects or obstacles in the environment of the autonomous vehicle 100 using both high precision detection and high recall detection, and the high precision detection and high recall detection are efficient enough to be executed in "real time" for the purposes of automatic driving. For instance, as described below, the system 200 may use high recall detection (higher sensitivity and lower accuracy) to identify any collidable objects or obstacles and generate initial object candidates, including objects or obstacles of common and known object types 110 and objects or obstacles without class identification 120 (e.g., rare or unknown objects). The system 200 may use high precision detection (higher accuracy), e.g., by using more accurate classifiers. In high recall detection 220, the system 200 processes sensor data quickly with lower accuracy, while in high precision detection 210, the system 200 processes sensor data at a slower speed but with higher accuracy. In addition, the system 200 can be implemented to process data from different kinds of sensors, e.g., LADAR, and video cameras, and combine the data from different sensors to improve overall object detection performance.

The system 200 may perform high precision detection 210 to detect objects and obstacles of common and known classes 110. The high precision detection 210 may be carried out by one or more image detectors (e.g., camera) and/or one or more point cloud detectors (e.g., LIDAR) tuned for high precision detection. The objects and obstacles of common and known classes 110 refer to objects or obstacles that can be classified by at least one known classifier (e.g., vehicle classifiers). For example, the objects and obstacles of common and known classes 110 can belong to any classification category, such as other vehicles, bicyclists, or pedestrians. In addition, the high precision detection may further identify contextual information about each object, for example, the speed and pose of the object, direction of movement, presence of other dynamic objects, and other information.

After the objects and obstacles of common and known classes 110 are detected, the system 200 may perform object tracking 212 to track movement of the detected objects over time and maintain their identity (e.g., vehicles, bicyclists, pedestrians) to identify tracked high precision objects 214. The tracked high precision objects 214 may include the closest vehicle in the same lane or different lanes as the autonomous vehicle 100.

The system 200 may additionally perform high recall detection 220 to detect objects and obstacles of common and known classes 110. The high recall detection 220 may be carried out by point cloud clustering by LIDAR, stereo depth vision by RADAR, and/or monocular depth vision using learned low-level features by RADAR, tuned for high recall detection.

The system 200 may further perform coverage filtering 222 to remove objects identified by the high recall detection 220 that match the tracked high precision objects 214, resulting in filtered high recall objects 224. Based on the information about the tracked high precision objects 214 and the filtered high recall objects 224, the system 200 may perform object motion prediction and ego motion planning 230 and ego vehicle control 240 of the autonomous vehicle 100.

Referring to FIG. 3a, an example flowchart of a method 300 for controlling the autonomous vehicle is provided, in accordance with various embodiments of the present disclosure. At 301a, the method 300 may include receiving data from a set of sensors, wherein the data represents objects or obstacles in the environment of the autonomous vehicle. In some embodiments, the set of sensors may include a two-dimensional object detector, a three-dimensional object detector, and/or an obstacle detector. In some embodiments, the set of sensors may include RADAR, LIDAR, camera, sonar, laser, or ultrasound.

At 302a, the method 300 may include identifying objects or obstacles from the received data. For example, the method 300 may include identifying various objects or obstacles in the physical environment of the autonomous vehicle by an object detection system. The objects may belong to one or more classes, such as cars, trucks, buses, etc. In some embodiments, the object detection system may utilize a neural network, e.g., a deep convolutional neural network (DCNN), for object detection. In addition, the same neural network (e.g., deep convolutional neural network) can also predict the centroid locations or other portions for each detected instance.

At 303a, the method 300 may include determining multiple sets of attributes of the objects or obstacles. In some embodiments, each set of attributes of the objects or obstacles may be determined based on data received by an individual sensor. In some embodiments, the individual sensor may be a RADAR, LIDAR, camera, sonar, laser, or ultrasound sensor. Different types of sensors may be used to determine different attributes of the objects or obstacles. For example, RADAR may be used to create 3D models and maps of objects and environments, and a camera may be used to determine attributes such as object classification information of the objects or obstacles. In some embodiments, the attributes of the objects or obstacles may include kinematic information, geometric information, or object classification information. In some embodiments, kinematic information may include position information, velocity information, and/or orientation information. In some embodiments, geometric information may include bounding boxes and/or object contours. In some embodiments, object classification information may include an object type.

At 304a, the method 300 may include determining a candidate trajectory for the autonomous vehicle based on the multiple sets of attributes of the objects or obstacles. At

305*a*, the method 300 may include controlling the autonomous vehicle according to the candidate trajectory. A candidate trajectory should allow the autonomous vehicle to avoid objects or obstacles in the environment of the autonomous vehicle. However, different attributes of the objects or obstacles can lead to different strategies for tracking. For example, the autonomous vehicle may identify an object or obstacle based on point cloud data obtained from a LIDAR. The autonomous vehicle may determine that the object or obstacle does not require further tracking because the velocity of the object or obstacle meets the characteristics of an obstacle (e.g., a tree, a building, a traffic sign) instead of an object (e.g., a person, a vehicle).

Referring now to FIG. 3*b*, an example flowchart of a method 300 for controlling the autonomous vehicle based on high precision and high recall detection is provided, in accordance with various embodiments of the present disclosure. At 301*b*, the method 300 may include receiving data from a set of sensors, wherein the data represents objects or obstacles in the environment of the autonomous vehicle. In some embodiments, the set of sensors may include a two-dimensional object detector, a three-dimensional object detector, and/or an obstacle detector. In some embodiments, the set of sensors may include RADAR, LIDAR, camera, sonar, laser, or ultrasound.

At 302*b*, the method 300 may include determining attributes of each of the objects or obstacles based on the received data from the set of sensors. As described above, the attributes of the objects or obstacles may include kinematic information, geometric information, or object classification information. In some embodiments, kinematic information may include position information, velocity information, and/or orientation information. In some embodiments, geometric information may include bounding boxes and/or object contours. In some embodiments, object classification information may include an object type.

At 303*b*, the method 300 may include integrating the attributes of each of the objects or obstacles. For example, the method 300 may process and synthesize all the information received in a process including sensor fusion of all sensor information received. In some embodiments, the method 300 may include performing sensor fusion for the received data from the set of sensors, such as two-dimensional object detectors, three-dimensional object detectors, and/or obstacle detectors. In some embodiments, the method 300 may include performing sensor fusion for the received data from a set of object detectors. At 304*b*, the integrated sensor data may be used for identification of objects or obstacles and/or determining one or more attributes of the objects or obstacles. The terms "integrate," "fuse," and "synthesize" are used interchangeably herein. Unlike the method illustrated in FIG. 3*a*, the method as described in FIG. 3*b* may integrate data received from two or more sensors, such that the data can be used to detect and/or track objects or obstacles.

In some embodiments, the method may include fusing received data from all sensors, such as vision sensors, LIDAR, and RADAR. In some embodiments, the sensors may include two stereo vision sensors, RADAR, and/or LIDAR. Stereo vision may use imaging technology to output bounded boxes of objects (e.g., cars, bikes, people, lanes, signs, and objects) found in the field of view of the cameras. RADAR systems may track locations and ranges of any objects that reflect RADAR—but cannot classify or identify those objects. The LIDAR system can recognize cars, bikes, or other objects and provides object classifications of the same.

In some embodiments, the method may include analyzing the fused data, including data from vision sensors, LIDAR, and/or RADAR, to determine a complete picture of objects surrounding the self-driving car.

At 304*b*, the method 300 may include determining a candidate trajectory for the autonomous vehicle based on the multiple sets of attributes of the objects or obstacles. At 305*b*, the method 300 may include navigating the autonomous vehicle according to the candidate trajectory at least to avoid objects or obstacles in the environment of the autonomous vehicle.

Referring now to FIG. 3*c*, an example flowchart of a method 300 for controlling the autonomous vehicle 100 based on high precision and high recall detection is provided, in accordance with various embodiments of the present disclosure. At 311, the method 300 may include receiving data from a set of sensors, wherein the data represents objects or obstacles in the environment of the autonomous vehicle. In some embodiments, the set of sensors may include a two-dimensional object detector, a three-dimensional object detector, and/or an obstacle detector. In some embodiments, the set of sensors may include RADAR, LIDAR, camera, sonar, laser, or ultrasound.

At 312, the method 300 may include generating high precision detection data based on the received data. In some embodiments, the method 300 may include generating the high precision detection data from the data received from one or more image detectors (e.g., camera) and/or one or more point cloud detectors (e.g., LIDAR) tuned for high precision detection. The high precision detection data may be generated from different kinds of sensors, e.g., LADAR, and video cameras, and combine the data from different sensors to improve overall object detection performance.

At 313, the method 300 may include identifying from the high precision detection data a first set of objects or obstacles that are classifiable by at least one known classifier (e.g., a vehicle classifier, a bicyclist classifier, a pedestrian classifier). For example, the objects and obstacles identified by a known classifier can belong to any classification category, such as other vehicles, bicyclists, or pedestrians. In addition, the method 300 may further include identifying contextual information about each object, for example, the speed and pose of the object, direction of movement, presence of other dynamic objects, and other information.

At 314, the method 300 may include tracking movement of one or more objects in the first set of objects or obstacles over time and maintaining identity (e.g., vehicles, bicyclists, pedestrians) of the tracked one or more objects in the first set of objects or obstacles. In some embodiments, the method 300 may include tracking movement of the one or more objects in the first set of objects or obstacles over a period of time when the one or more objects are detectable by the set of sensors. In some embodiments, the period is from about 100 ms to about 500 ms. In some embodiments, the period is about 300 ms.

At 315, the method 300 may include generating high recall detection data based on the received data. At 316, the method 300 may include identifying from the high recall detection data a second set of objects or obstacles without using any classifier, e.g., a vehicle classifier, a bicyclist classifier, or a pedestrian classifier). In some embodiments, the method 300 may include generating the high recall detection data from point cloud clustering by LIDAR, stereo depth vision by RADAR, and/or monocular depth vision using learned low-level features by RADAR. In some embodiments, the learned low-level features comprise distance.

In some embodiments, the method 300 may include generating the high precision detection data and the high recall detection data based on different subsets of data received from different sets of sensors. the method 300 may include performing sensor fusion for the different subsets of data received from different sets of sensors in order to generate the high detection data or the high recall detection data.

At 317, the method 300 may include filtering out objects, from the second set of objects or obstacles, that correspond to the tracked one or more objects in the first set of objects or obstacles, to obtain a filtered set of objects or obstacles. In some embodiments, the method 300 may include filtering out a set of points corresponding to the tracked one or more objects in the first set of objects or obstacles from at least one point cloud of the second set of objects or obstacles.

At 318, the method 300 may include determining a candidate trajectory for the autonomous vehicle to avoid at least the tracked one or more objects in the first set of objects or obstacles and the filtered set of objects or obstacles. At 319, the method 300 may further include controlling the autonomous vehicle according to the candidate trajectory.

Figure 4:
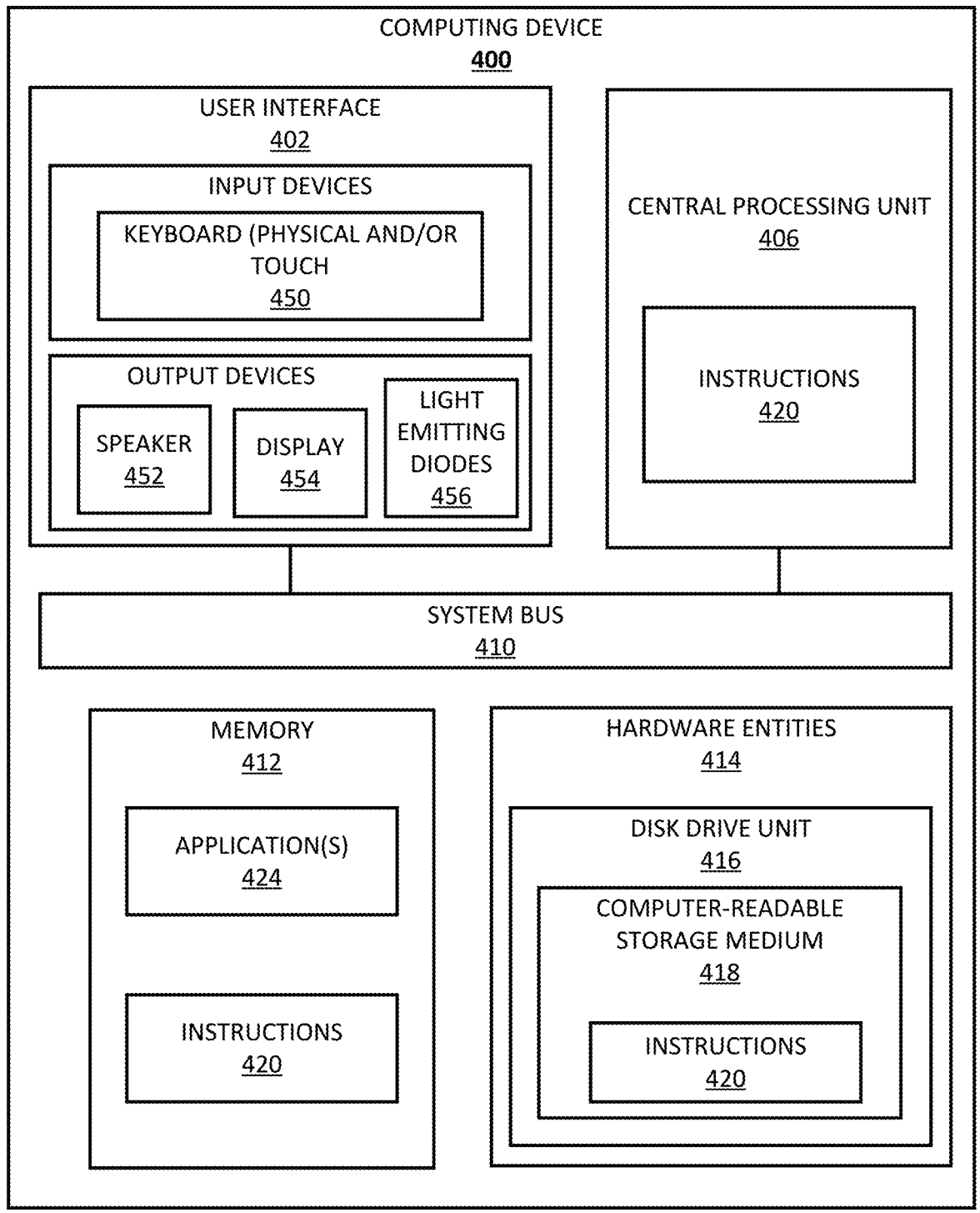
FIG. 4 illustrates example elements of a computing device, according to various embodiments of the present disclosure.

Referring now to FIG. 4, an illustration of an example architecture for a computing device 400 is provided.

The hardware architecture of FIG. 4 represents one example implementation of a representative computing device configured to one or more methods and means for controlling the autonomous vehicle 100 in response to an abnormal condition of the autonomous vehicle 100, as described herein. As such, the computing device 400 of FIG. 4 implements at least a portion of the method(s) described herein (for example, method 300 of FIGS. 3a-c).

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 may include a user interface 402, a Central Processing Unit ("CPU") 406, a system bus 410, a memory 412 connected to and accessible by other portions of computing device 400 through system bus 410, and hardware entities 414 connected to system bus 410. The user interface can include input devices and output devices, which facilitate user-software interactions for controlling operations of the computing device 400. The input devices may include, but are not limited to, a physical and/or touch keyboard 450. The input devices can be connected to the computing device 400 via a wired or wireless connection (e.g., a Bluetooth® connection). The output devices may include, but are not limited to, a speaker 452, a display 454, and/or light-emitting diodes 456.

At least some of the hardware entities 414 perform actions involving access to and use of memory 412, which can be a Random Access Memory (RAM), a disk driver and/or a Compact Disc Read Only Memory (CD-ROM), among other suitable memory types. Hardware entities 414 can include a disk drive unit 416 comprising a computer-readable storage medium 418 on which is stored one or more sets of instructions 420 (e.g., programming instructions such as, but not limited to, software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding or carrying a set of instructions 420 for execution by the computing device 400 and that cause the computing device 400 to perform any one or more of the methodologies of the present disclosure.

Figure 5:
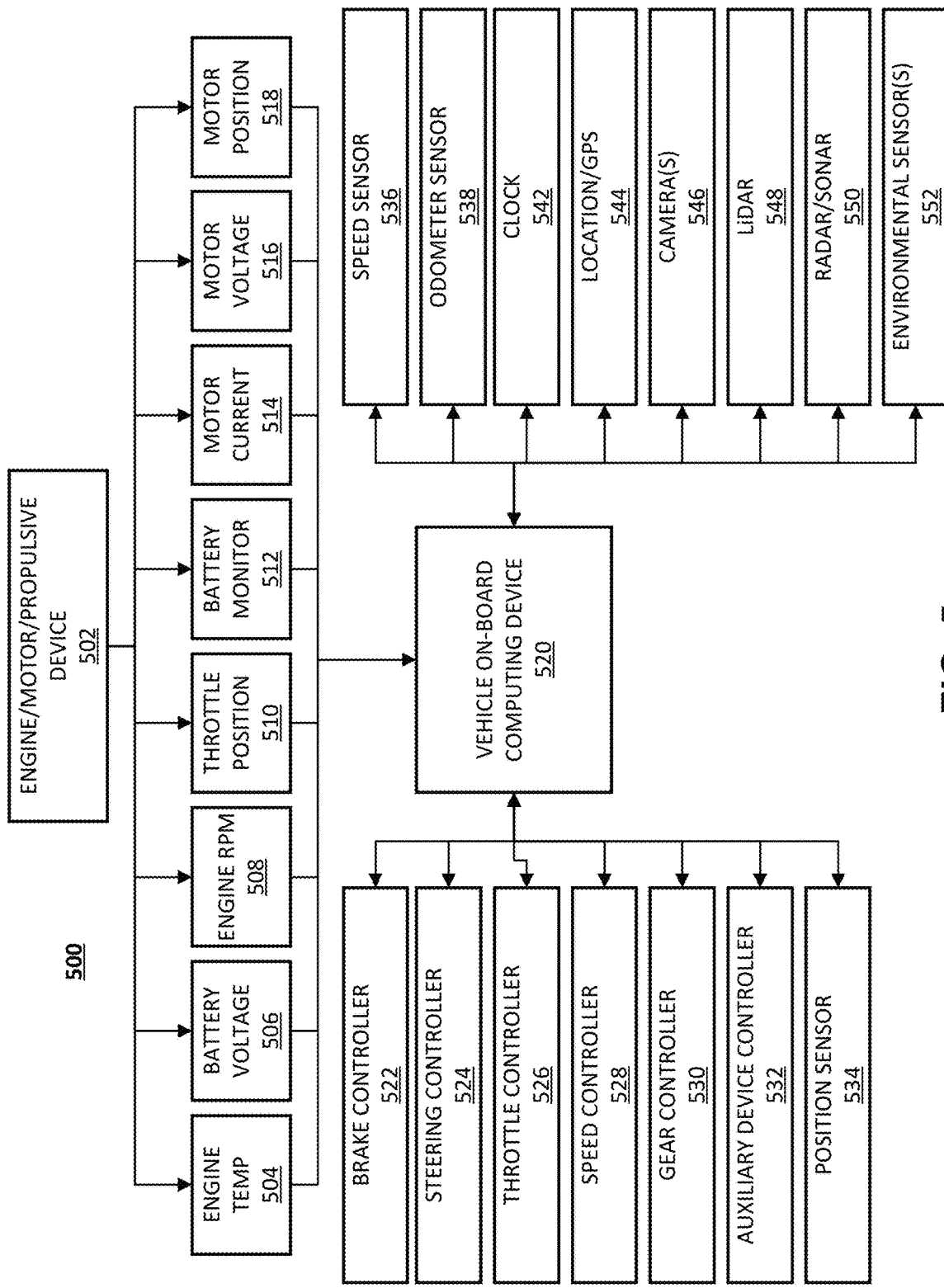
FIG. 5 illustrates an example architecture of a vehicle, according to various embodiments of the present disclosure.

Referring now to FIG. 5, an example vehicle system architecture 500 for a vehicle is provided, in accordance with various embodiments of the present disclosure.

The autonomous vehicle 100 of FIG. 1 can have the same or similar system architecture as shown in FIG. 5. Thus, the following discussion of vehicle system architecture 500 is sufficient for understanding the autonomous vehicle 100 of FIG. 1.

As shown in FIG. 5, the vehicle system architecture 500 includes an engine, motor or propulsive device (e.g., a thruster) 502 and various sensors 504-518 for measuring various parameters of the vehicle system architecture 500. In gas-powered or hybrid vehicles having a fuel-powered engine, the sensors 504-518 may include, for example, an engine temperature sensor 504, a battery voltage sensor 506, an engine Rotations Per Minute (RPM) sensor 508, and/or a throttle position sensor 510. If the vehicle is an electric or hybrid vehicle, then the vehicle may have an electric motor, and accordingly will have sensors such as a battery monitoring system 512 (to measure current, voltage and/or temperature of the battery), motor current 514 and voltage 516 sensors, and motor position sensors such as resolvers and encoders 518.

Operational parameter sensors that are common to both types of vehicles include, for example, a position sensor 534, such as an accelerometer, gyroscope and/or inertial measurement unit; a speed sensor 536; and/or an odometer sensor 538. The vehicle system architecture 500 also may have a clock 542 that the system uses to determine vehicle time during operation. The clock 542 may be encoded into the vehicle onboard computing device 520. It may be a separate device, or multiple clocks may be available.

The vehicle system architecture 500 also may include various sensors that operate to gather information about the environment in which the vehicle is traveling. These sensors may include, for example, a location sensor 544 (for example, a Global Positioning System (GPS) device); object detection sensors such as one or more cameras 546; a LIDAR sensor system 548; and/or a radar and/or a sonar system 550. The sensors also may include environmental sensors 552, such as a precipitation sensor and/or ambient temperature sensor. The object detection sensors may enable the vehicle system architecture 500 to detect objects that are within a given distance range of the vehicle 500 in any direction, while the environmental sensors 552 collect data about environmental conditions within the vehicle's area of travel.

During operations, information is communicated from the sensors to an onboard computing device 520. The onboard computing device 520 may be configured to analyze the data captured by the sensors and/or data received from data providers, and may be configured to optionally control operations of the vehicle system architecture 500 based on the results of the analysis. For example, the onboard computing device 520 may be configured to control: braking via a brake controller 522; direction via a steering controller 524; speed and acceleration via a throttle controller 526 (in a gas-powered vehicle) or a motor speed controller 528 (such as a current level controller in an electric vehicle); a differential gear controller 530 (in vehicles with transmissions); and/or other controllers.

Geographic location information may be communicated from the location sensor 544 to the onboard computing device 520, which may then access a map of the environment that corresponds to the location information to determine known fixed features of the environment such as streets, buildings, stop signs and/or stop/go signals. Captured images from the cameras 546 and/or object detection information captured from sensors such as LIDAR 548 are communicated from those sensors to the onboard computing device 520. The object detection information and/or captured images are processed by the onboard computing device 520 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method of controlling an autonomous vehicle, comprising:
   receiving data from a set of sensors, wherein the data represents objects or obstacles in an environment of the autonomous vehicle; and
   using a processor:
   identifying objects or obstacles from the received data from the set of sensors;
   determining multiple sets of attributes of the objects or obstacles, wherein each set of attributes of the objects or obstacles are determined based on data received by a sensor of the set of sensors;
   determining a candidate trajectory for the autonomous vehicle based on the multiple sets of attributes of the objects or obstacles; and
   controlling the autonomous vehicle according to the candidate trajectory,
   wherein the method further comprises:
   generating high precision detection data based on the received data from the set of sensors;
   identifying from the high precision detection data a first set of objects or obstacles that are classifiable by at least one known classifier;
   tracking movement of one or more objects in the first set of objects or obstacles over time and maintaining identity of the tracked one or more objects in the first set of objects or obstacles;
   generating high recall detection data based on the received data from the set of sensors;
   identifying from the high recall detection data a second set of objects or obstacles without using any classifier;
   filtering out objects, from the second set of objects or obstacles, that correspond to the tracked one or more objects in the first set of objects or obstacles to obtain a filtered set of objects or obstacles; and
   determining a candidate trajectory for the autonomous vehicle to avoid at least the tracked one or more objects in the first set of objects or obstacles and the filtered set of objects or obstacles.

2. The method of claim 1, wherein the multiple sets of attributes comprise kinematic information, geometric information, or object classification information.

3. The method of claim 1, comprising generating the high precision detection data and the high recall detection data based on different subsets of data received from different sets of sensors.

4. The method of claim 1, wherein the step of filtering comprises filtering out a set of points corresponding to the tracked one or more objects in the first set of objects or obstacles from at least one point cloud of the second set of objects or obstacles.

5. The method of claim 1, comprising generating the high precision detection data from the data received from image and point cloud detectors.

6. The method of claim 1, comprising generating the high recall detection data from point cloud clustering by LIDAR, stereo depth vision by RADAR, and/or monocular depth vision using learned low-level features by RADAR.

7. The method of claim 6, wherein the learned low-level features comprise distance.

8. The method of claim 1, wherein the step of tracking comprises tracking movement of the one or more objects in the first set of objects or obstacles over a period of time when the one or more objects are detectable by the set of sensors.

9. The method of claim 8, wherein the period is from about 100 ms to about 500 ms.

10. The method of claim 1, wherein the set of sensors comprise a two-dimensional object detector, a three-dimensional object detector, and/or an obstacle detector.

11. The method of claim 1, wherein the set of sensors comprise RADAR, LIDAR, camera, sonar, laser, or ultrasound.

12. A system for controlling an autonomous vehicle, comprising:
    a set of sensors, configured to receive data that represents objects or obstacles in an environment of the autonomous vehicle; and
    a processor, configured to:
    identify objects or obstacles from the received data from the set of sensors;
    determine multiple sets of attributes of the objects or obstacles, wherein each set of attributes of the objects or obstacles are determined based on data received by a sensor of the set of sensors;
    determine a candidate trajectory for the autonomous vehicle based on the multiple sets of attributes of the objects or obstacles; and
    control the autonomous vehicle according to the candidate trajectory, wherein the processor is further configured to:
    generate high precision detection data based on the received data from the set of sensors;
    identify, from the high precision detection data, a first set of objects or obstacles that are classifiable by at least one known classifier;
    track movement of one or more objects in the first set of objects or obstacles over time and maintain identity of the tracked one or more objects in the first set of objects or obstacles;
    generate high recall detection data based on the received data from the set of sensors;

identify from the high recall detection data a second set of objects or obstacles without using any classifier;

filtering out objects, from the second set of objects or obstacles, that correspond to the tracked one or more objects in the first set of objects or obstacles to obtain a filtered set of objects or obstacles; and determine a candidate trajectory for the autonomous vehicle to avoid at least the tracked one or more objects in the first set of objects or obstacles and the filtered set of objects or obstacles.

13. The system of claim 12, wherein the multiple sets of attributes comprise kinematic information, geometric information, or object classification information.

14. The system of claim 12, wherein the processor is configured to generate the high precision detection data and the high recall detection data based on different subsets of data received from different sets of sensors.

15. The system of claim 12, wherein the processor is configured to filter out a set of points corresponding to the tracked one or more objects in the first set of objects or obstacles from at least one point cloud of the second set of objects or obstacles.

16. The system of claim 12, wherein the processor is configured to generate the high precision detection data from the data received from image and point cloud detectors.

17. The system of claim 12, wherein the processor is configured to generate the high recall detection data from point cloud clustering by LIDAR, stereo depth vision by RADAR, and/or monocular depth vision using learned low-level features by RADAR.

18. The system of claim 17, wherein the learned low-level features comprise distance.

19. The system of claim 12, wherein the processor is configured to track movement of the one or more objects in the first set of objects or obstacles over a period of time when the one or more objects are detectable by the set of sensors.

20. The system of claim 12, wherein the set of sensors comprise a two-dimensional object detector, a three-dimensional object detector, and/or an obstacle detector.

* * * * *